United States Patent [19]

Yanagihara et al.

[11] Patent Number: 5,768,048
[45] Date of Patent: Jun. 16, 1998

[54] TAPE CASSETTE COVER OPENING AND CLOSING DEVICE

[75] Inventors: Takefumi Yanagihara, Saijo; Akio Konishi, Sanda, both of Japan

[73] Assignee: Matsushita Electric Industrial Co., Ltd., Japan

[21] Appl. No.: 676,508

[22] Filed: Jul. 8, 1996

[30] Foreign Application Priority Data

Jul. 7, 1995 [JP] Japan .................................. 7-171848

[51] Int. Cl.$^6$ .................................................. G11B 15/675
[52] U.S. Cl. ............................ 360/96.5; 360/96.6; 360/93
[58] Field of Search ................................ 360/96.5, 96.6, 360/93

[56] References Cited

U.S. PATENT DOCUMENTS

| | | | |
|---|---|---|---|
| 4,782,407 | 11/1988 | Hwang | 360/93 X |
| 4,794,477 | 12/1988 | Hashiguchi et al. | 360/96.5 |
| 4,796,117 | 1/1989 | Fleck | 360/96.5 |
| 5,103,357 | 4/1992 | Nakanishi | 360/96.5 |
| 5,291,354 | 3/1994 | Kim | 360/96.5 |
| 5,408,370 | 4/1995 | Shiokawa et al. | 360/96.5 X |
| 5,500,778 | 3/1996 | Ahn | 360/96.5 |

*Primary Examiner*—John H. Wolff
*Attorney, Agent, or Firm*—Parkhurst & Wendel

[57] ABSTRACT

A cassette holder adapted to hold a tape cassette and to lift and lower said tape cassette therein provided with an opener which is urged by a spring to turn around the axis of an opener support shaft during the lifting and lowering of the cassette holder with the lower end of the cover of the tape cassette abutting against an inclined surface of the opener. Further, an opener kicking portion at the front end of a stand fixed to a chassis abuts against the opener to turn the latter during the lifting and lowering.

1 Claim, 4 Drawing Sheets

FIG.3
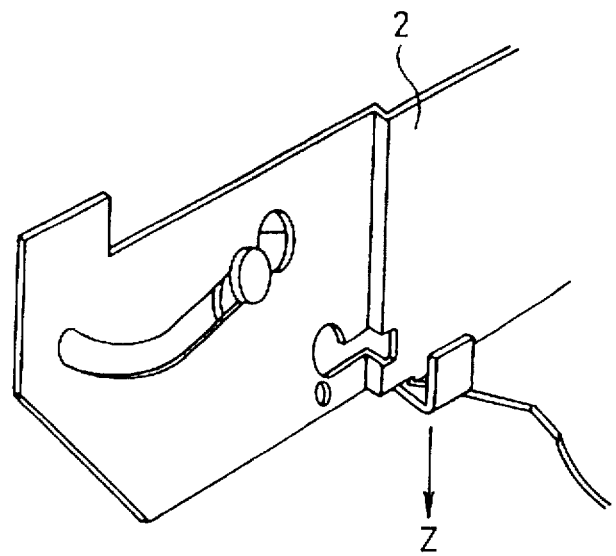
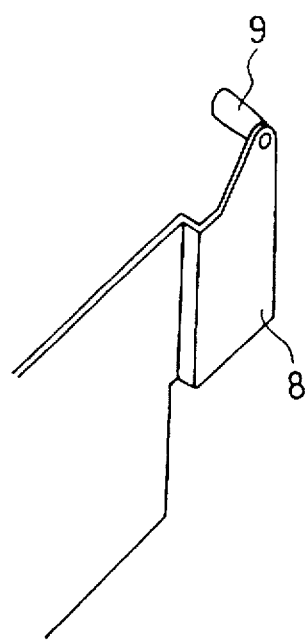
PRIOR ART

TAPE CASSETTE COVER OPENING AND CLOSING DEVICE

FIELD OF THE INVENTION

The present invention relates to a tape cassette cover opening and closing device for opening and closing the cover of a tape cassette, such as a videocassette, provided with a cover for protecting the tape.

BACKGROUND OF THE INVENTION

Recently, miniaturization of record reproducing devices using tape cassettes, such as videocassettes, has advanced, and tape cassettes have become very small while still requiring reliability.

A conventional tape cassette cover opening and closing device will now be described.

FIG. 3 is a partial perspective view of a conventional tape cassette cover opening and closing device, and FIG. 4 is a side view showing the operation thereof. In FIGS. 3 and 4, the numeral 6 denotes a tape cassette, wherein a tape cassette cover 6a for protecting the tape is rotatably supported on a pivot 6b. The numeral 2 denotes a cassette holder adapted to be lifted and lowered by a lifting mechanism 10, whereby a cassette tape 6 held therein is positioned and fixed on the chassis (not shown). Numeral 8 denotes a stand fixed on the chassis. The stand has at its front end an opener pin 9 which is a cylindrical small projection. During the lifting and lowering of the tape cassette 6, the front end of the tape cassette cover 6a abuts against the opener pin 9. The numeral 7 denotes a cassette guide for guiding the tape cassette during the lifting and lowering thereof. The cassette guide is fixed to the chassis such that it abuts against the end surface of the tape cassette 6 opposite to the tape cassette cover 6a.

The operation of the tape cassette cover opening and closing device constructed in the manner described above will now be described with reference to FIGS. 4a–d. First, when the tape cassette 6 is pushed into the cassette holder 2 by a user pressing it, the cassette holder 2 holding the cassette tape 6 therein lowers in the Z-direction (FIG. 4 (a)). During the lowering movement, the tape cassette cover 6a abuts against the opener pin 9, whereupon the tape cassette cover 6a starts turning around the pivot 6b in the X-direction (FIG. 4 (b)). As it further lowers in the Z-direction, the fixing of the tape cassette 6 is completed through the stage shown in FIG. 4 (c), with the tape cassette cover 6a being fully opened now (FIG. 4 (d)).

With the conventional arrangement described above, however, the amount of engagement between the tape cassette cover 6a and the opener pin 9 is small when they abut against each other, as shown in FIG. 4 (b). Further, since a spring (not shown) is contained in the tape cassette in such a manner as to return the tape cassette cover 6a in the direction opposite to the X-direction, it follows that when the tape cassette cover 6a is turned in the X-direction, the cassette tape 6 is moved in the Y-direction by the reaction of the spring until it abuts against the cassette guide 7. Thereby, the amount of engagement between the tape cassette cover 6a and the opener pin 9 is further decreased when they abut against each other, causing the tape cassette cover 6a and the opener pin 9 to disengage from each other. As a result, a problem arises that the tape cassette cover 6a is fixed in its closed state with the engagement cancelled.

Further, the position of the opener pin is limited by the amount of opening of the tape cassette cover 6a in the fixed state of the tape cassette 6 shown in FIG. 4 (d), making it impossible to move it from this position.

The present invention is intended to solve the above-mentioned conventional problem and has for its object the provision of a tape cassette cover opening and closing device capable of reliably fixing a tape cassette in the record reproducing position with the tape cassette cover positively opened.

DISCLOSURE OF THE INVENTION

To achieve this object, a tape cassette cover opening and closing device according to the invention comprises a cassette holder adapted to receive and hold a tape cassette having an upwardly-turning openable cover in the front portion thereof, a lifting mechanism for lifting and lowering said cassette holder and fixing said tape cassette inserted thereinto to a chassis, and an opener having the center of rotation thereof in said cassette holder and including an inclined surface adapted to slide the lower end of the tape cassette cover thereon, said opener being adapted to rotate in linkage with the lowering movement of the cassette holder toward the chassis.

With this arrangement, the tape cassette cover can be opened in the lowering stage of the tape cassette.

The present invention, arranged in the manner described above, enables the tape cassette cover opening operation to be reliably performed. Further, by changing the angle of inclination and curvature of the inclined surface of the opener, it is possible to realize a highly improved tape cassette cover opening and closing device which allows optional setting of the timing for opening the tape cassette cover.

BRIEF DESCRIPTION OF THE DRAWINGS

FIG. 3 is a partial perspective view of a tape cassette cover opening and closing device in a conventional embodiment.

PREFERRED EMBODIMENT

Figure 1:
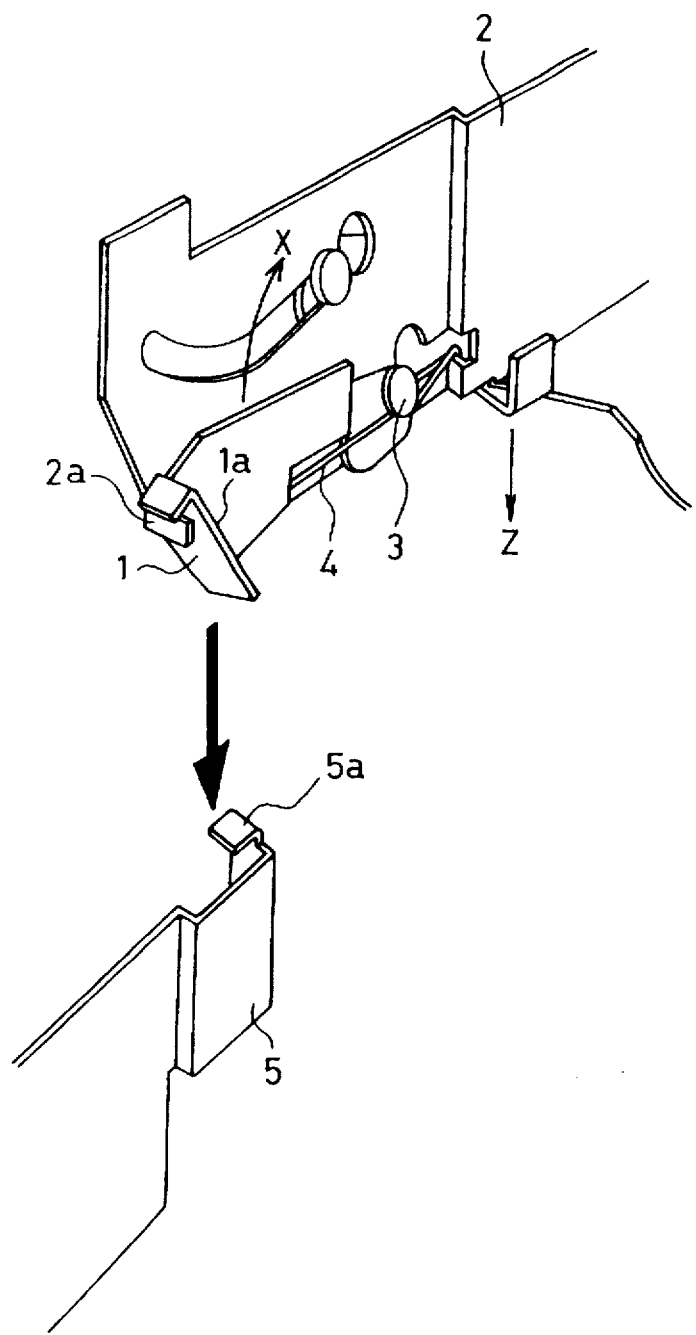
FIG. 1 is a partial perspective view of a tape cassette cover opening and closing device in a first embodiment of the invention.

An embodiment of the invention will now be described with reference to the drawings. FIG. 1 is a partial perspective view of a tape cassette cover opening and closing device in an embodiment of the invention, and FIGS. 2a–d are side views for explaining the operation thereof.

Figure 2:
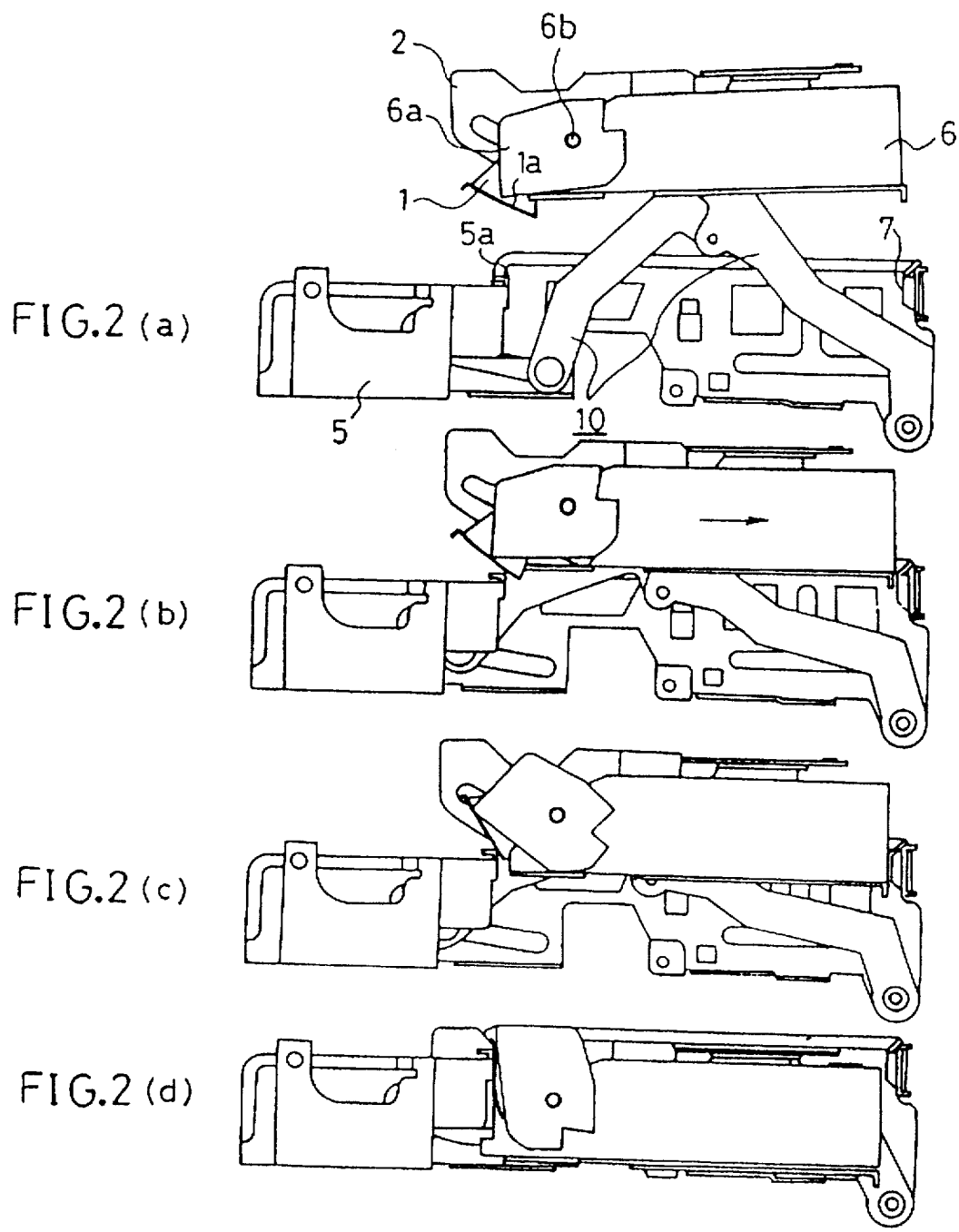
FIGS. 2a–d are side views for explaining the operation thereof.
Figure 4:
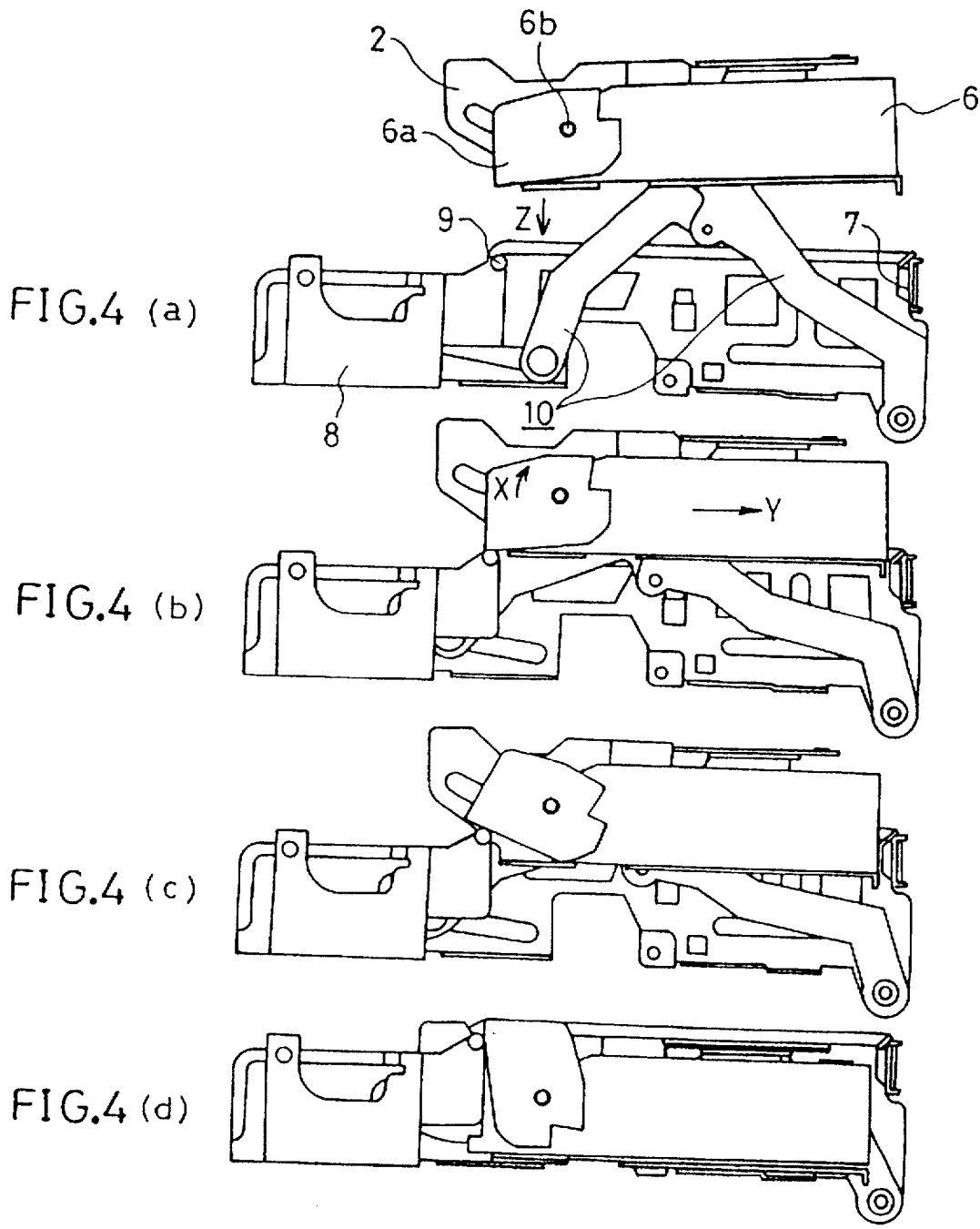
FIGS. 4a–d are side views for explaining the operation thereof.

In FIGS. 1 and 2, numeral 1 denotes an opener rotatably attached to a portion of a cassette holder 2 by means of an opener support shaft 3. The opener 1 is urged by an opener returning spring 4 which is a returning means in the direction opposite to the X-direction which is the direction of rotation of the tape cassette cover, and the opener 1 is stopped abutting against a portion, shown as 2a, of the cassette holder 2. Numeral 5 denotes a stand which, as in the case of the stand 8 in the conventional example shown in FIG. 3, is fixed to the chassis (not shown), and has at its front end an opener kicking portion 5a adapted to abut against the opener 1 during the lifting of the cassette holder 2. The rest of the arrangement is similar to that shown in the conventional example.

The operation of the tape cassette cover opening and closing device in the present embodiment arranged in the manner described above will now be described with reference to FIGS. 2a–d. First, when the tape cassette 6 is pushed into the cassette holder 2 by a user, in the same manner as in the conventional example, the cassette holder 2 holding the tape cassette 6 therein lowers in the Z-direction (FIG. 2 (a)).

During the lowering, when the opener 1 and the opener kicking portion 5a abut against each other, the opener 1 is turned in the X-direction around the axis of the opener support shaft 3, and the opener inclined surface 1a and the tape cassette cover 6a abut against each other (FIG. 2 (b)).

As the tape cassette 6 further lowers in the Z-direction, the tape cassette cover 6a slides along the opener inclined surface 1a, thereby rotating in the X-direction around the tape cassette cover center 6b. The tape cassette cover 6a becomes fully opened via the state of FIG. 2 (c), thus completing the fixing of the tape cassette (FIG. 2 (d)).

As has so far been described, according to the present invention, by providing a sufficiently increased amount of engagement between the opener inclined surface 1a and the tape cassette cover 6a, the operation of opening the tape cassette cover 6a is reliably effected, and by optionally changing the angle of inclination and curvature of the opener inclined surface 1a, it is possible to optionally set the timing for opening the tape cassette cover 6a.

In the embodiment, the lifting mechanism is comprised of a so-called crossover type link mechanism, but it is not necessarily limited thereto.

Further, the opener returning spring has been shown as an example of the opener returning means, but some other urging means may be used.

What is claimed is:

1. A tape cassette cover opening and closing device, comprising;

a cassette holder adapted to receive and hold a tape cassette having an upwardly-turning openable cover in the front portion thereof and urging means for urging said cover in a closing direction, a lifting mechanism for lifting and lowering said cassette holder and fixing said tape cassette inserted thereinto to a chassis, an opener having an inclined surface adapted to slidably abut a front lower end of said tape cassette cover at a top side thereof, an opener supporting shaft spaced from the front lower end of said tape cassette cover and integral with said cassette holder, a cam member on an underside of said inclined surface of said opener, a returning means for urging said opener in the direction opposite to an opening direction of said tape cassette cover, and an opener kicking portion fixed to said chassis and adapted to abut said cam member of said opener to rotate said opener during cassette holder lifting or lowering.

* * * * *